Feb. 24, 1925.

O. KONRAD 1,527,416

FOLDABLE BED COUCH

Filed Jan. 10, 1922

2 Sheets-Sheet 1

INVENTOR.
Otto Konrad,
BY Morsell & Keeney
ATTORNEYS.

Feb. 24, 1925.

O. KONRAD

FOLDABLE BED COUCH

Filed Jan. 10, 1922

INVENTOR.
Otto Konrad.
BY Morsell & Keeney,
ATTORNEYS.

Patented Feb. 24, 1925.

1,527,416

UNITED STATES PATENT OFFICE.

OTTO KONRAD, OF OSHKOSH, WISCONSIN, ASSIGNOR TO THREE C DAVENPORT COMPANY, OF OSHKOSH, WISCONSIN, A CORPORATION OF WISCONSIN.

FOLDABLE BED COUCH.

Application filed January 10, 1922. Serial No. 528,286.

*To all whom it may concern:*

Be it known that I, OTTO KONRAD, a citizen of the United States, and resident of Oshkosh, in the county of Winnebago and State of Wisconsin, have invented new and useful Improvements in Foldable Bed Couches, of which the following is a description, reference being had to the accompanying drawings, which are a part of this specification.

This invention relates to foldable bed couches and has for its object to provide a device of this character which will be simple in construction, comparatively inexpensive to manufacture and more efficient in use than those that have been heretofore proposed.

A further object of the invention is to provide a foldable couch in which the extension portion is adapted to be housed beneath the ordinary seat portion of the couch when it is not being used as a bed and the parts are so designed and constructed that this said extension portion may be folded and disposed beneath the said seat portion without requiring any movement of the latter.

With these and other objects in view, the invention consists in the novel details of construction and combinations of parts more fully hereinafter described, and particularly pointed out in the claims.

Figure 1:
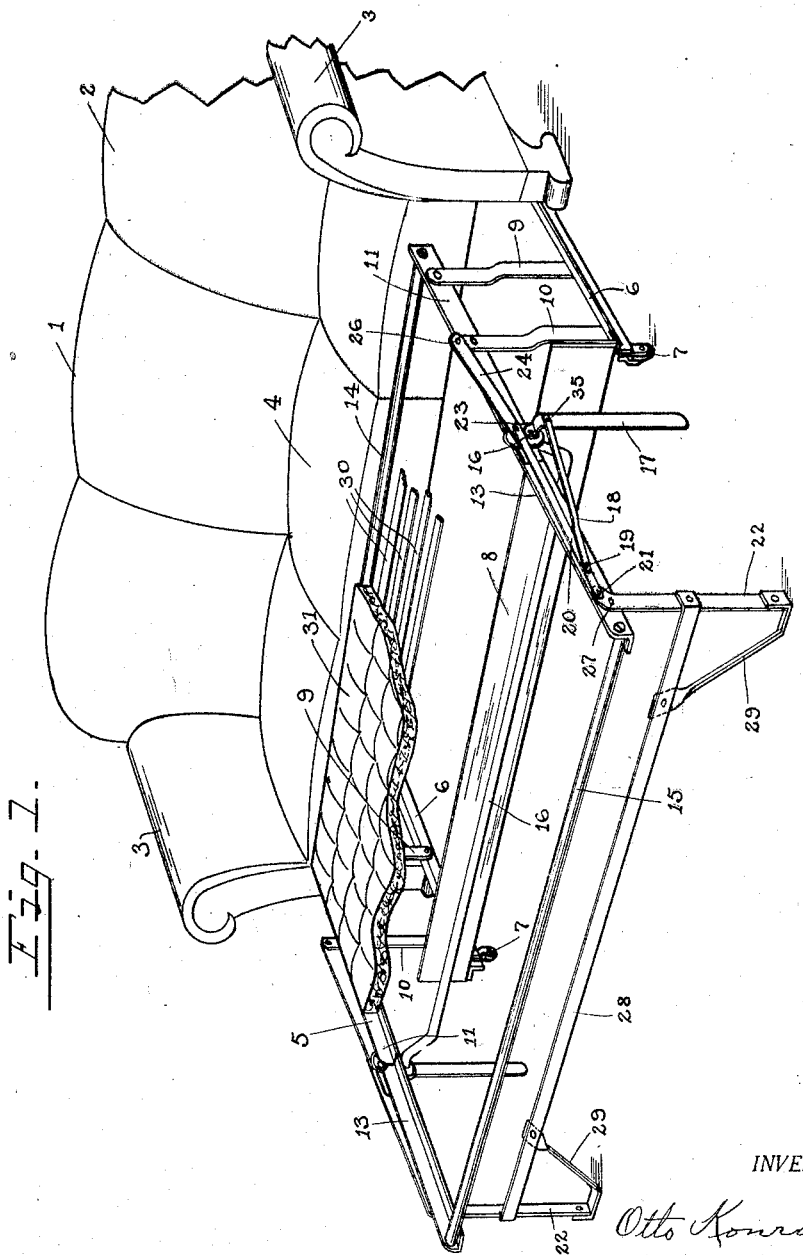
Figure 2:
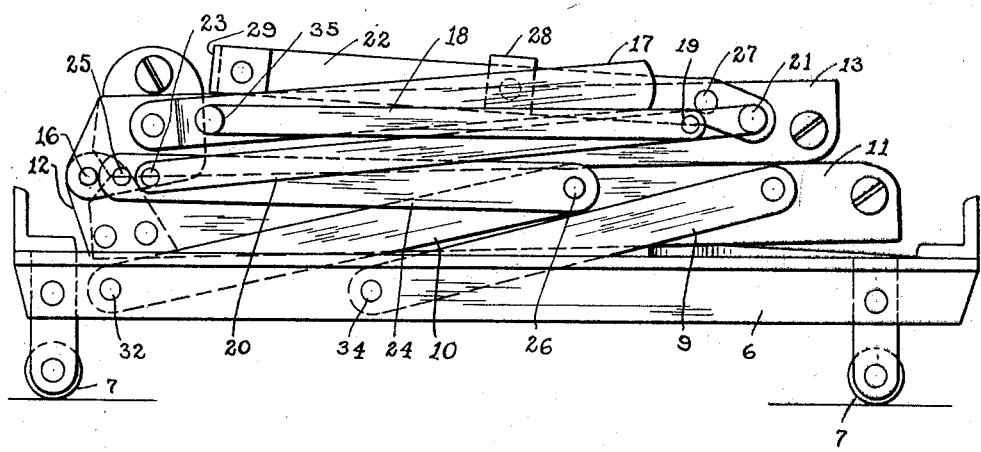
Figure 3:
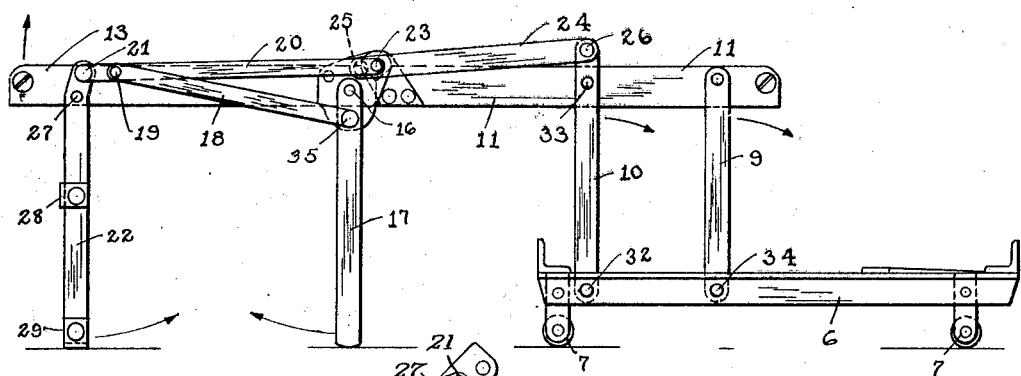
Figure 4:
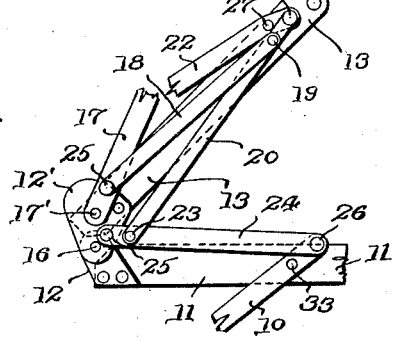

Referring to the accompanying drawings in which like numerals designate like parts in all the views:

Figure 1 is a diagrammatic perspective view of a foldable bed couch made in accordance with the present invention, Fig. 2 is a side elevational view of the extension member in its folded position, Fig. 3 is a view similar to Fig. 2 of the extension member in its extended or operative position; and Figure 4 is a fragmentary elevational view, showing a portion of the frame in partially folded condition.

1 indicates a couch or sofa of any suitable construction provided with the back 2, ends or arms 3 and seat portion 4. Associated with the said couch 1 is an extension frame work 5 composed of horizontally disposed members 6 provided at their ends with suitable rollers or casters 7 and adapted to slide or roll along the floor beneath the couch 1. Said members 6 are suitably joined together as by the longitudinal bracing member 8 and to each of the said members 6 there is pivoted a pair of vertically extending arms 9 and 10 as will be clear from Fig. 1. The upper ends of the said arms 9 and 10 are pivotally secured to a horizontally disposed member 11 and the said members 11 are provided at their left hand ends as seen in the said figure with the hinge plates 12 to which are pivotally secured as by the pivot pins 16, the companion hinge plates 12′, rigidly secured to the ends of the horizontally disposed members 13. The free ends of the pairs of members 11 and 13 are suitably connected together by the bracing rods 14 and 15 respectively.

Pivotally secured to the plate 12′, as by the pin 17′, is a vertical supporting member 17, which has pivotally connected to it, near its uppermost portion, a link 18, the other end of which is pivotally connected as at 19 to a link member 20, one end of which is pivotally connected as at 21 to a vertical supporting member 22, while the other end of said link member 20 is pivotally connected as at 23 to a third link member 24. This said member 24 has one of its ends pivoted as at 25 to the horizontal member 13 while its other end is pivotally connected, as at 26, to the upper end of the vertical member 10, all as will be clear from the drawings. The vertical supporting members 22 are pivotally secured to the horizontal members 13 as at 27 and they are suitably secured together by the bracing member 28 having the angularly disposed connecting braces 29 constituting feet therefor, as will be readily apparent. Suitable strips or slats 30 may be disposed longitudinally between the pairs of horizontal members 11 and 13 to support a mattress or pad 31, as best shown in Fig. 1.

The operation of the improved bed couch will be clear from the foregoing but may be briefly summarized as follows:

Supposing the parts to be in the positions illustrated in Fig. 1 and it is desired to fold up the extension member, it is only necessary to grasp the horizontally disposed members 13 and swing them in a clockwise direction about their pivots 16, which motion will be transmited through the pivots 25 to the link members 24, moving them toward the right, as seen in Fig. 4. The movement of said last mentioned link members will, through their connection with the vertical members 10, cause the latter to swing about their pivots 32 and through their connections 33 with the horizontal members 11 will cause the latter to produce a corresponding movement of the vertical members 9 about their pivots 34. The movements thus produced will cause the horizontal members 11 to move downwardly and to the right, as seen in Figs. 1 and 3 of the drawings, to the position illustrated in Fig. 2.

The movement of the link members 24 will, through the connections 23, cause a movement of the link members 20, which in turn will produce an arcuate movement of the supporting members 22, as well as a longitudinal movement of the link members 18, through their connections 19 and the said members 18 will, through their connections 35, cause an arcuate movement of the vertical supporting members 17, as illustrated in Fig. 4. The various parts are so designed and constructed that the movements just described will, when completed, have caused the extension member to be folded from the position shown in Figs. 1 and 3 to that shown in Fig. 2, whereupon the entire member may be pushed upon its rollers 7 beneath the seat 4 of the couch 1, where it will be entirely hidden from view. When in this position, the various folded parts will lie completely behind the longitudinal bracing member 8 which now serves as a front for the lower portion of the couch.

It is obvious that those skilled in the art may vary the details of the construction as well as the arrangement of parts, without departing from the spirit of the invention and therefore it is not wished to be limited to the above disclosures except as may be required by the claims.

What is claimed is:

1. A foldable extension frame for bed couches comprising a plurality of slidable supporting members; a plurality of pairs of vertical supporting members pivotally secured to said slidable members; a pair of horizontal members pivotally secured to said vertical members; a second pair of horizontal members pivotally secured to said first pair; additional pairs of vertical supporting members secured to said horizontal members; and connections comprising a pair of link members connecting one pair of said first mentioned vertical members with said second pair of horizontal members, a second pair of link members connecting said first mentioned link members with one of said additional pairs of vertical members, and a third pair of link members connecting said second pair of link members to another of said additional pairs of vertical members, said link connections being adapted to automatically cause all of said members to assume a substantially horizontal plane in close proximity to said slidable members when said second horizontal members are moved about their pivots.

2. In a foldable bed couch the combination with a couch having a space beneath the seat, of an extension frame comprising a plurality of slidable supporting members adapted to move into and out of said space; a plurality of pairs of vertical supporting members pivotally secured to said slidable members; a pair of horizontal members pivotally secured to said vertical members; a second pair of horizontal members directly pivotally secured to said first pair; a pair of vertical supporting members movably secured to said second pair of horizontal members adjacent their pivot point; an additional pair of vertical supporting members secured to said second pair of horizontal members adjacent the free end of the latter; and pivoted link connections comprising a pair of link members connecting one pair of said first mentioned vertical members with said second pair of horizontal members, a second pair of link members connecting said first mentioned link members with one of said additional pairs of vertical members, and a third pair of link members connecting said second pair of link members to another of said additional pairs of vertical members, said link connections being adapted to cause all of said members to assume a substantially horizontal plane, when said horizontal members are folded together.

In testimony whereof I affix my signature.

OTTO KONRAD.